United States Patent
Olson et al.

(10) Patent No.: US 10,099,526 B2
(45) Date of Patent: Oct. 16, 2018

(54) TRAILER HITCH SPRING BAR COVER SYSTEM

(71) Applicant: Grease Guard LLC, Valencia, CA (US)

(72) Inventors: Sharol L. Olson, Valencia, CA (US); Kimberly L. Osborn, Valencia, CA (US); Diane E. Barker, Valencia, CA (US)

(73) Assignee: Grease Guard LLC, Valencia, CA (US)

( * ) Notice: Subject to any disclaimer, the term of this patent is extended or adjusted under 35 U.S.C. 154(b) by 86 days.

(21) Appl. No.: 15/243,057

(22) Filed: Aug. 22, 2016

(65) Prior Publication Data

US 2017/0050482 A1    Feb. 23, 2017

Related U.S. Application Data

(60) Provisional application No. 62/207,969, filed on Aug. 21, 2015.

(51) Int. Cl.
*B60D 1/60* (2006.01)
*B60D 1/24* (2006.01)

(52) U.S. Cl.
CPC ........... *B60D 1/605* (2013.01); *B60D 1/60* (2013.01); *B60D 1/247* (2013.01)

(58) Field of Classification Search
CPC ........... B60D 1/586; B60D 1/60; B60D 1/605
See application file for complete search history.

(56) References Cited

U.S. PATENT DOCUMENTS

| | | | |
|---|---|---|---|
| 2,671,675 A | | 3/1954 | Swaisgood |
| 3,228,445 A | | 1/1966 | Mayotte |
| 3,596,926 A | * | 8/1971 | Randall ............... B60D 1/60 280/507 |
| 3,706,211 A | * | 12/1972 | Owen .................. B60D 1/24 232/41 E |
| 3,860,267 A | | 1/1975 | Lyons |
| 4,141,569 A | * | 2/1979 | Dilk .................... B60D 1/60 280/507 |
| 4,181,320 A | * | 1/1980 | Wellborn, Jr. ........ B60D 1/60 280/507 |
| 4,493,134 A | * | 1/1985 | Karr ................... F16G 11/14 174/92 |

(Continued)

FOREIGN PATENT DOCUMENTS

| | | | | |
|---|---|---|---|---|
| DE | 3623426 A1 | * | 1/1988 | ............ B60D 1/60 |
| DE | 202013005353 U1 | * | 6/2013 | ........... B60D 1/173 |

(Continued)

*Primary Examiner* — Joseph M Rocca
*Assistant Examiner* — Maurice L Williams
(74) *Attorney, Agent, or Firm* — Neustel Law Offices (57) ABSTRACT

A trailer hitch spring bar cover system for providing clean and safe storage of a trailer weight distribution system including spring bars and towing balls. The cover for a trailer weight distribution spring bar generally includes a first body and a second body movably connected to the first body. Each of the bodies have a first end, a second end, a perimeter edge, a cavity, and a cutout near an end of the body. The cover has an opened state adapted to receive or remove a greased portion of the spring bar. The cover also has a closed state to substantially enclose a greased portion of the spring bar.

21 Claims, 9 Drawing Sheets

(56) References Cited

U.S. PATENT DOCUMENTS

| | | | |
|---|---|---|---|
| 4,824,136 A | 4/1989 | Baxter | |
| 4,848,054 A | 7/1989 | Blitzer | |
| 4,861,062 A * | 8/1989 | Stidsen | B60D 1/60 280/507 |
| 5,359,866 A * | 11/1994 | Boddy | F16B 2/10 24/270 |
| 5,421,601 A | 6/1995 | Hinze | |
| 5,503,486 A * | 4/1996 | Zane | B42F 3/04 281/27.1 |
| 5,527,056 A | 6/1996 | Hoagland | |
| 5,560,631 A * | 10/1996 | Salvo | B60D 1/60 280/507 |
| 5,593,170 A | 1/1997 | Chiu | |
| 5,618,073 A | 4/1997 | Criscione | |
| 5,658,004 A | 8/1997 | Flanik | |
| 5,681,053 A * | 10/1997 | Misukanis | B60D 1/60 280/507 |
| 5,720,492 A | 2/1998 | Wanzenried | |
| 5,775,139 A * | 7/1998 | Sellers | B60D 1/60 280/507 |
| 5,791,677 A | 8/1998 | Froehlich | |
| 5,806,873 A | 9/1998 | Glassman | |
| 5,816,731 A | 10/1998 | Howard | |
| 5,829,775 A | 11/1998 | Maxwell | |
| 5,845,520 A * | 12/1998 | Dolev | E05B 67/32 70/2 |
| 6,019,386 A | 2/2000 | Morelock | |
| 6,039,339 A | 3/2000 | Bello | |
| D425,833 S | 5/2000 | Robinson | |
| 6,322,094 B1 * | 11/2001 | Poe | B60D 1/60 280/507 |
| 6,325,121 B1 | 12/2001 | Hudnall | |
| 6,332,853 B1 | 12/2001 | Bowman | |
| 6,412,806 B1 | 7/2002 | Peacock | |
| 6,857,652 B2 | 2/2005 | Dougherty | |
| D503,663 S | 4/2005 | Kolflat | |
| 6,913,278 B1 | 7/2005 | Laska | |
| 6,938,912 B1 * | 9/2005 | Norton | B60D 1/06 280/507 |
| 6,945,551 B2 | 9/2005 | Blake | |
| 6,955,369 B1 * | 10/2005 | Schiebout | B60D 1/58 280/154 |
| 6,976,695 B1 * | 12/2005 | Smith | B60D 1/28 280/507 |
| 7,014,205 B1 | 3/2006 | Reilly | |
| 7,125,035 B1 | 10/2006 | Huenefeld | |
| 7,677,589 B2 | 3/2010 | Prine | |
| 7,703,791 B2 | 4/2010 | Varjassy | |
| 7,716,898 B1 | 5/2010 | Dunn | |
| 7,883,103 B1 | 2/2011 | Greaves, Jr. | |
| 8,196,949 B1 | 6/2012 | Hernandez | |
| 9,731,570 B1 * | 8/2017 | Rodriguez | B60D 1/605 |
| 2002/0084643 A1 | 4/2002 | Trampe | |
| 2002/0136600 A1 * | 9/2002 | Thompson | B60D 1/01 403/364 |
| 2003/0106348 A1 * | 6/2003 | Nilges | B60D 1/60 70/14 |
| 2003/0189313 A1 * | 10/2003 | Sievers | B60D 1/06 280/507 |
| 2006/0061064 A1 | 3/2006 | Johnson | |
| 2006/0181060 A1 * | 8/2006 | Bussiere | B60D 1/60 280/507 |
| 2007/0085361 A1 * | 4/2007 | Hauser | B60R 13/04 296/1.08 |
| 2009/0058045 A1 | 3/2009 | Trubody | |
| 2010/0025965 A1 | 2/2010 | Caldwell | |
| 2010/0307520 A1 * | 12/2010 | Dahle | A45D 40/18 132/200 |
| 2014/0290105 A1 * | 10/2014 | Calverley | B60D 1/60 40/591 |
| 2016/0339751 A1 * | 11/2016 | Odom | B60D 1/60 |
| 2017/0020254 A1 * | 1/2017 | Kim | A45C 13/001 |

FOREIGN PATENT DOCUMENTS

| | | | | |
|---|---|---|---|---|
| DE | 202014103619 U1 * | 9/2014 | | B60R 25/00 |
| EP | 1216857 A2 * | 6/2002 | | B60D 1/60 |
| EP | 1251017 A1 * | 10/2002 | | B60D 1/60 |
| EP | 1612065 A1 * | 1/2006 | | B60D 1/06 |
| FR | 1407224 A * | 7/1965 | | B60D 1/60 |
| FR | 2426583 A1 * | 12/1979 | | B60D 1/60 |
| FR | 2432947 A1 * | 3/1980 | | B60D 1/586 |
| WO | WO-2004006040 A1 * | 1/2004 | | B60D 1/28 |

* cited by examiner

TRAILER HITCH SPRING BAR COVER SYSTEM

CROSS REFERENCE TO RELATED APPLICATIONS

I hereby claim benefit under Title 35, United States Code, Section 119(e) of U.S. provisional patent application Ser. No. 62/207,969 filed Aug. 21, 2015. The 62/207,969 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to a trailer hitch spring bar cover system for providing clean and safe storage of a trailer weight distribution system including spring bars and towing balls.

Related Art

Any discussion of the related art throughout the specification should in no way be considered as an admission that such related art is widely known or forms part of common general knowledge in the field.

Pull trailers, especially those defined as bumper pull rather than fifth-wheel pull include boat trailers, camper trailers, utility trailers, car hauling trailers, livestock and horse trailers and others. Pull trailers typically employ a trailer hitch coupler that is removably attached to a trailer hitch ball mounted to a vehicle.

The points of contact between the pull trailer and the towing vehicle create points of high stress since many thousands of pounds of pressure bear down on just a few heavy duty connecting points. These points include the coupling between a trailer coupler socket and hitch ball, as well as the load-leveling spring bar attachments to the adjustable load stabilizing head. To reduce wear, and thereby maintain a long service life of these components, lubrication grease is liberally applied to these high friction points of the spring bars and hitch balls.

Those familiar with towing trailers understand that trailers are routinely attached and detached from the towing vehicle. Further, when certain trailers are attached to load stabilizing towing heads, detaching the trailer also involved detaching the removable spring loading bars that are used to stabilize and level the trailer and towing vehicle during towing.

It is also well known that the effectiveness of lubricating grease is substantially diminished when dirt or similar grit becomes embedded in the grease. More importantly, the addition of dirt or grit into grease applied to high friction connection points, such as a trailer coupler socket and towing hitch ball, increased friction, galling and unwanted metal removal during towing often result. The service life of towing components is significantly shortened by dirt-contaminated grease.

Some components, namely stabilizing spring bars (e.g. round spring bars, trunnion spring bars) are therefore often stored in the vehicle or trailer to prevent the grease from becoming contaminated. However, one problem with storing greasy spring bars is that the grease itself becomes the contaminate, and soils whatever surface is contact, requiring cleanup. Grease that has come off of the components must then be replaced, requiring the trailer owner to use rags or other means to transfer grease from a container to the greased area of the components.

In instances where trailer hitch balls remain on the vehicle hitch after disconnecting the trailer, people walking near the rear of the vehicle inadvertently rub against the ball, contaminating their clothes with grease that had been applied to the ball. In this instance, once again, the uncovered hitch ball has caused clothes to be ruined, and the owner must then reapply grease to replace the grease removed by the contact. Further, the uncovered, greased hitch ball is exposed to dust and dirt that can easily contaminate the remaining grease, requiring complete removal of the contaminated grease, and greasing of the ball before reconnecting the trailer.

These problems are well known in the industry. Some devices have been created with the promise of solving many of these problems. For instance, trailer hitch ball covers have been known for many decades. As a fast and cheap means to cover greased hitch balls, trailer owners have cut slits in the wall of a traditional tennis ball so that it can be fit over the hitch ball. Although this creative "fix" prevents grease from being transferred to a passerby's pants leg, when it comes time to remove the tennis ball cover to re-couple the trailer, the mere act of removing the ball cover removes a substantial amount of grease from the ball, leaving the owner the option of hitching up the trailer with a poorly greased ball, or re-greasing the ball before connecting the coupler. It can be readily seen that the solution just described is inadequate since is actually creates a new series of problems.

Various manufacturers have attempted to solve these secondary problems with products that minimize contact with the hitch ball when slipping the cover over the ball, but the final analysis is that the ball cover must incorporate geometry that grips the ball to prevent it from accidentally falling off, the geometry just described creating the same grease-removing problem as just described. Although the amount of grease that is removed when removing the cover may be less than the amount of grease removed when using the tennis ball solution, even the reduced amount of grease requires the owner to re-grease the ball before re-coupling the trailer.

In some instances when load stabilizing spring bars are removed, the owner may use plastic bags as a means to protect the greased ends of the bar from becoming contaminated with dirt, and further prevent the greased bar from contaminating the surface upon which they are stored. As can be readily seen, plastic bags or other flexible greased-end covers only solve part of the problems just mentioned. However, the inside of the plastic bags, or the contact surface of other flexible covers become soiled with the grease, and ultimately remove some of the grease from the spring bar ends, necessitating the need to re-grease the spring bar ends before re-attaching them to the adjustable spring bar head.

Therefore, those skilled in the art will appreciate the convenience, extended period of time between re-greasing trailer towing components, the extended service life of the components, and the commercial value of new and novel accessories that are easily attached to grease-coated towing system components when the trailer is removed, that prevent the grease from becoming contaminated by dirt, prevent the grease from contaminating clean surfaces, and which can be easily removed without removing an excessive amount of grease that would be insufficient to properly reduce the friction and wear on the high load surfaces.

SUMMARY

An example embodiment of the present invention is directed to a trailer hitch spring bar cover system. The cover for a trailer weight distribution spring bar generally includes a first body and a second body movably connected to the first body. Each of the bodies have a first end, a second end, a perimeter edge, a cavity, and a cutout near an end of the body. The cover has an opened state adapted to receive or remove a greased portion of the spring bar. The cover also has a closed state to substantially enclose a greased portion of the spring bar.

By incorporating precisely located standoffs, ribs and other internal structures within a substantially rigid enclosure, the accessory covers of the present invention minimize actual contact surface contact area between the covers and greased surfaces of the components retained within the covers. The minimized contact area thereby provides for the minimum of grease to be removed from the component during installation or removal of the cover, eliminating the requirement for an owner to constantly re-grease the components as would be is required when using the traditional towing component covers.

Therefore, one exemplary embodiment of the present invention is a substantially rigid enclosure comprising a hinged assembly of a plurality of manufactured parts that when closed and latched, is removably secured around the greased surface areas of towing components.

Another exemplary embodiment of the present invention is a substantially rigid hinged cover assembly providing for resilient standoffs and/or rib details on the interior surface of the cover components, the standoffs and/or rib details thereby projecting inwardly until contacting the greased surface of the towing components such that the components remains substantially centered within the closed and latched enclosure.

Still another exemplary embodiment of the present invention is a substantially rigid hinged cover assembly providing for substantially rigid standoffs and/or rib details projecting towards the interior from the interior surface of the cover components, the standoffs and/or rib details thereby contacting the greased surface of the towing components such that the components remains substantially centered within the closed and latched enclosure.

Another exemplary embodiment of the present invention is a substantially hinged cover assembly providing for a plurality of substantially rigid and non-rigid standoffs and/or rib details on the interior surface of the cover components, the standoffs and/or rib details thereby contacting the greased surface of the towing components such that the components remains substantially centered within the closed and latched enclosure.

Another exemplary embodiment of the present invention is a means to secure the hookup chain of a tow stabilizing spring bar assembly to a hinged enclosure installed over the greased surfaces of the spring bar.

Another exemplary embodiment of the present invention is a protective cover for a greased trailer hitch ball comprising two hingedly attached exterior shells, together which form a substantially spherical structure, with standoff ribs and/or protrusions integral to the interior surfaces of the shells and projecting inwardly, the standoff ribs and/or protrusions thereby positioning the closed cover substantially equidistant from the greased spherical surface of the tow hitch ball.

Yet another exemplary embodiment of the present invention is a cover comprising two hingedly attached enclosures, with resilient standoff ribs and/or protrusions projecting towards the interior from the interior surface of the enclosure, the resilient standoff ribs or protrusions thereby providing for a single size of one cover to fit snugly around towing components that are of different sizes.

These and other embodiments will become known to those skilled in the art, especially considering the convenience, extended period of time between re-greasing trailer towing components, the extended service life of the components, and the commercial value of new and novel accessories that are easily attached to grease-coated towing system components when the trailer is removed. They will also appreciate the benefits provided by the present invention, specifically the prevention the dirt contaminating grease that is applied to towing components, and easy removal of the covers that minimize the necessity of re-greasing components to replace grease removed by traditional covers.

There has thus been outlined, rather broadly, some of the features of the trailer hitch spring bar cover system in order that the detailed description thereof may be better understood, and in order that the present contribution to the art may be better appreciated. There are additional features of the trailer hitch spring bar cover system that will be described hereinafter and that will form the subject matter of the claims appended hereto. In this respect, before explaining at least one embodiment of the trailer hitch spring bar cover system in detail, it is to be understood that the trailer hitch spring bar cover system is not limited in its application to the details of construction or to the arrangements of the components set forth in the following description or illustrated in the drawings. The trailer hitch spring bar cover system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

An example trailer hitch spring bar cover system generally comprises cover for a trailer weight distribution spring bar generally includes a first body and a second body movably connected to the first body. Each of the bodies have a first end, a second end, a perimeter edge, a cavity, and a cutout near an end of the body. The cover has an opened state adapted to receive or remove a greased portion of the spring bar. The cover also has a closed state to substantially enclose a greased portion of the spring bar.

The word "standoff" is used herein to mean a "rib", "stanchion", "finger", "tapered protrusion" or "spacer" as a means to position one object at a specified dimension from a second object, the terms not being limited, and having the same effect and meaning. Further, standoff as used herein shall mean a rigid, semi-rigid or flexible permanent feature located within the interior surface of an enclosure, the standoff or plurality of standoffs positioning an article within the interior area of an enclosure at preferred dimensions from the interior surfaces of a removable covering enclosure.

Figure 1:
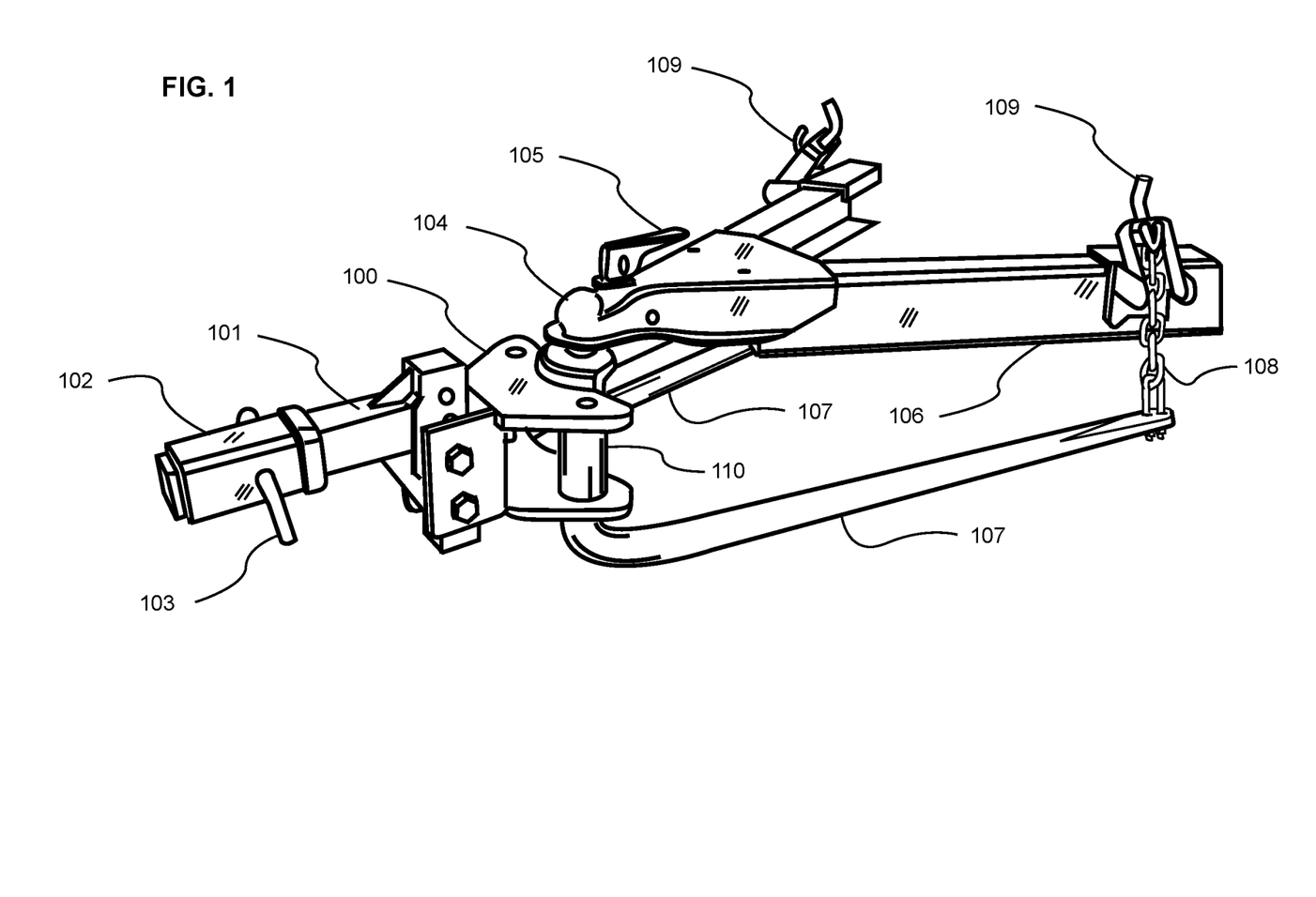
FIG. 1 is an exemplary diagram showing a perspective view of a load stabilizing towing system incorporating round load leveling spring bars.

FIG. 1 is an exemplary diagram showing a perspective view of a load stabilizing towing system incorporating round load leveling spring bars. More specifically, the primary components of a load stabilizing towing system connecting a trailer to a towing vehicle comprise a tongue portion of the trailer frame 106 extending forward of the main frame of a trailer. A trailer ball coupler 104 is the forward-most terminus of the grams providing for the ultimate connection between the trailer frame and the tow hitch of the vehicle. A lockable latch 105 secures the coupler to a spherical trailer hitch ball not shown. It should be noted that a major point of loading, and therefore friction is between the coupler 104 and the hitch ball not shown.

The hitch ball is affixed securely to an adjustable spring bar head 100 that is secured with a plurality of bolts to a shank 101 typically formed of tubular steel. The shank is slid into and secured within a hitch receiver tube 102 by means of a cross pin 103 that extends laterally through aligning holes through the receiver tube and shank. The receiver tube is typically welded as an integral component of a trailer hitch not shown, but which is mounted to the frame of a towing vehicle.

In the drawing, a pair of round spring bars 107 are inserted into spring bar sleeves 110 integral to the spring bar head 100, with one of spring bars positioned on the one side of the coupler, and one spring bar positioned on the opposed side of the coupler. Hookup brackets 109 are secured over a portion of the tongue of the trailer frame 106. Thereafter, load leveling is realized when the hookup chains 108 affixed to one end of each spring bar are tensioned by the lever of each hookup bracket. Tensioning the ends of the spring bars distal to the point at which the spring bars are movably affixed to the adjustable spring bar head 100 creates a torsional force against the entire spring bar head, shank and receiver tube assembly, thereby leveling the load distribution between the trailer and towing vehicle. It should be noted that a second primary point of loading, and therefore creation of frictional forces is the surface area contact between the exterior of the substantially vertical portion of the spring bars 107 and the interior of the spring bar sleeve 110.

A petroleum-based lubricant is typically applied to the high friction points between the spring bar and sleeve, and further to the interior surface of the coupler socket and mating spherical hitch ball, thereby reducing friction and wear between the high friction contact points.

Figure 2:
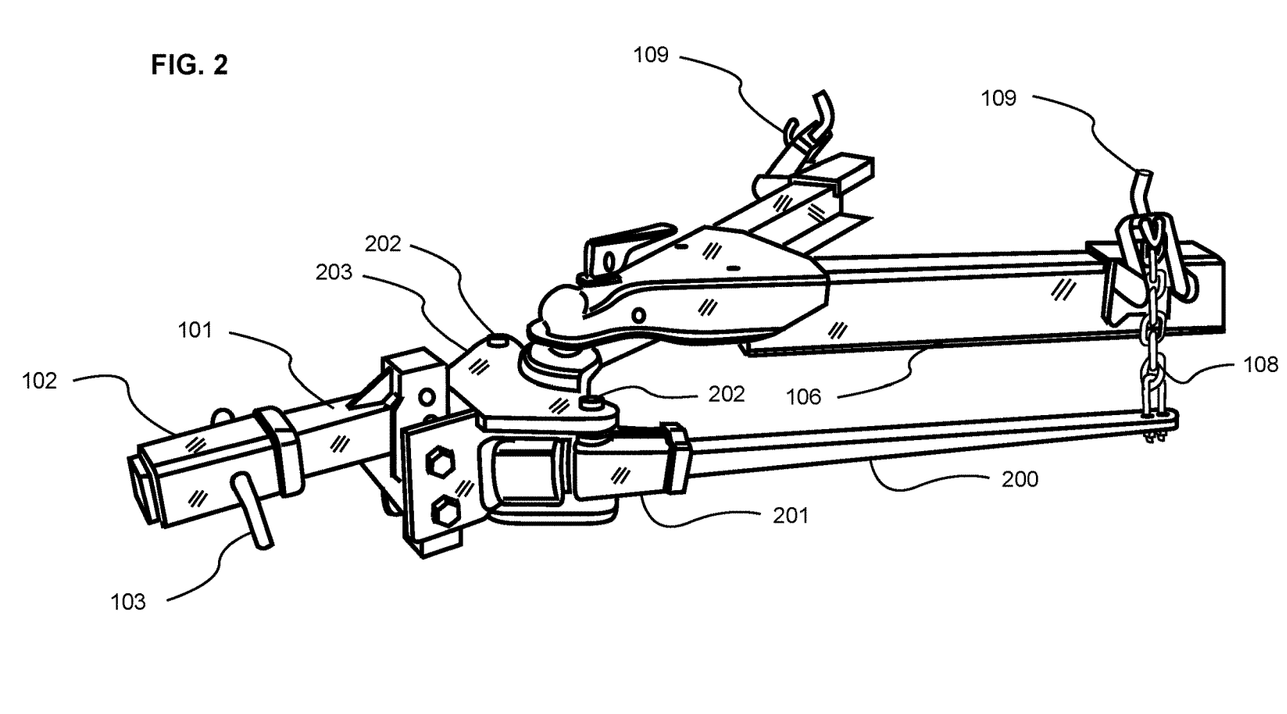
FIG. 2 is an exemplary diagram showing a perspective view of a load stabilizing towing system incorporating load leveling trunnion spring bars.

FIG. 2 is an exemplary diagram showing a perspective view of a load stabilizing towing system incorporating load leveling trunnion spring bars. As a variation to the load stabilizing system just described in FIG. 1, a pair of trunnion spring bars 200 are used instead of round spring bars.

A first end of the trunnion spring bar is permanently affixed to a trunnion bar end 201 comprising one substantially upwardly projecting trunnion and one substantially downward projecting trunnion. The trunnions are inserted into and retained by trunnion receiving sockets 202, the sockets being integral to an adjustable ball trunnion head 203 that is removably affixed in a desired position to a shank 101. The shank is inserted into and retained by a receiver hitch pin 103 within a receiver tube 102 that is typically permanently welded to the trailer hitch frame not shown.

Now then, after inserting the trunnions of the trunnion bar end 201 into the receiving sockets 202, the hookup chains 108 that are affixed to the spring bar end distal to the trunnion bar end 201 are tensioned by the tensioning lever of the hookup brackets 109 secured to the trailer tongue 106. Tensioning the ends of the trunnion bars distal to the point at which the trunnions are movably affixed to the adjustable trunnion bar head 203 creates a torsional force against the entire trunnion bar head, shank and receiver tube assembly, thereby leveling the load distribution between the trailer and towing vehicle.

It should be noted that a second primary point of loading, and therefore creation of frictional forces is the surface area contact between the exterior of each of two trunnions on each of two trunnion bar ends 201 and the interior of the trunnion receiving sockets 202.

A petroleum-based lubricant, for example, a lithium-based grease, is typically applied to the high friction points between the trunnions and trunnion receiving sockets, and further to the interior surface of the coupler socket and mating spherical hitch ball as previously described, thereby reducing friction and wear between the high friction contact points, extending the service life of the adjoining components.

Figure 3:
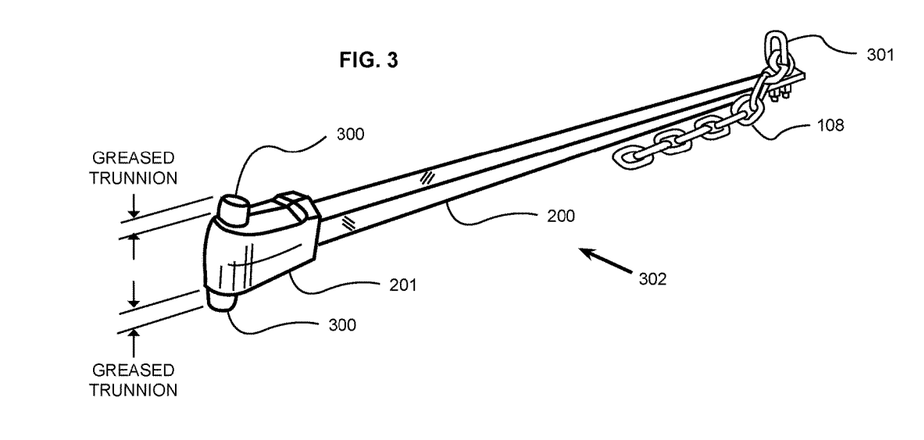
FIG. 3 is an exemplary diagram showing a perspective view of a trunnion spring bar assembly.

FIG. 3 is an exemplary diagram showing a perspective view of a trunnion spring bar assembly 302 comprising a spring bar 200 typically tapered from a larger substantially cross sectional geometry at the point of attachment to a trunnion head 201 to a smaller substantially cross sectional geometry at a distal end to which a U-bolt 301 is affixed. The U-bolt is inserted into an end link of a hookup chain 108 which is thereby affixed to the distal end of the spring bar.

The trunnion end 201 is formed from a high strength material using appropriate manufacturing methods, for instance, forged steel, and comprises two trunnions 300, with a first trunnion projecting upwardly from the top surface of the trunnion end, and the second trunnion projecting downwardly from the bottom surface of the trunnion end. The substantially cylindrically projecting trunnions are substantially coaxially aligned.

Since the trunnions are inserted into trunnion receiving sockets as previously described, those skilled in the art will appreciate that the trunnions are therefore high load-carrying points, and as indicated by callouts in the drawing, require lubrication to reduce metal-to-metal friction, wear and degradation.

Those skilled in the art will further appreciate that in instances when the trunnion spring bars are removed from the adjustable trunnion bar head when the trailer is uncoupled, the greased trunnions as just described will have greasy surfaces, small metal filings resulting from the frictional contact with the sleeve, and possibly, dirt. The greased trunnions will therefore have to be covered to prevent contamination of the grease by dirt, and likewise prevent the grease from contaminating or soiling surfaces the trunnions may come in contact with during handling or storage.

Figure 4:
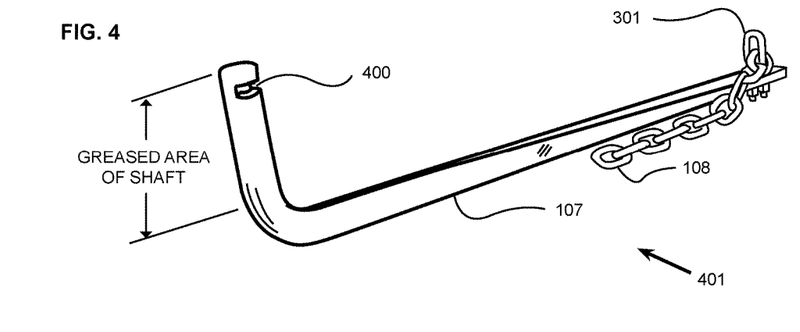
FIG. 4 is an exemplary diagram showing a perspective view of a round spring bar assembly.

FIG. 4 is an exemplary diagram showing a perspective view of a round spring bar assembly 401 comprising a tapered round spring bar 107 formed with one end machined with a retaining feature 400 and bent at an obtuse angle to the longitudinal axis of the bar, and a distal end into which a U-bolt 301 is affixed. The U-bolt is inserted into an end link of a hookup chain 108 which is thereby affixed to the distal end of the spring bar.

In use, as was previously described, the angled end of the spring bar is inserted into a spring bar sleeve not shown, and retained therein by means of an interlocking detail within the sleeve that mates with the retaining slot 400 feature of the spring bar. The high friction points of the spring bar are generally defined as the exterior surface areas of the bent end of the spring bar that contact the spring bar sleeve. Therefore, the end of the bar requiring lubrication is shown by the callout on the drawing as the greased area of the shaft.

Those skilled in the art will appreciate that in instances when the round spring bar is removed form the adjustable spring bar head when the trailer is uncoupled, the greased area of the shaft as just described will contain grease, small metal filings resulting from the frictional contact with the sleeve, and possibly, dirt. This greased end of the bar will therefore have to be covered to prevent contamination of the grease by dirt, and likewise prevent the grease from contaminating or soiling surfaces it may come in contact with during handling or storage.

Figure 5A:
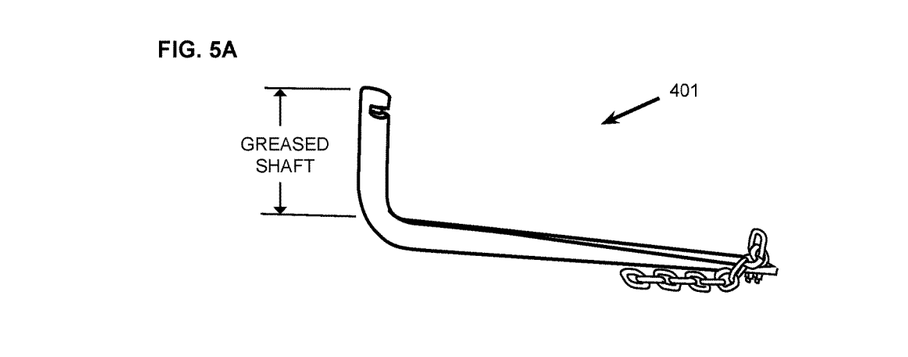
FIG. 5A is an exemplary diagram showing a greased area of a round spring bar assembly.

FIG. 5A is an exemplary diagram showing a greased area of a round spring bar assembly. As a reference to the round spring bar just described, the spring bar assembly 401 is shown with a callout illustrating the greased area of the bar.

Figure 5B:
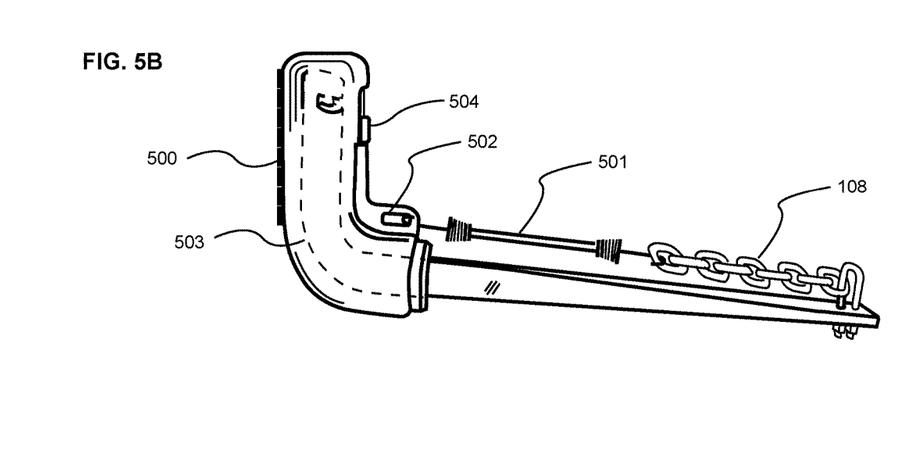
FIG. 5B is an exemplary diagram showing an example embodiment of a cover over the greased area of a round spring bar assembly.

FIG. 5B is an exemplary diagram showing a cover over the greased area of a round spring bar assembly. More specifically, a spring bar cover 500 is shown enclosing the greased end of a spring bar, the outline of the invisible greased end portion of the encapsulated spring bar 503 being indicated by a dotted line. The cover therefore fully encloses the greasy portion of the spring bar to prevent contamination of the grease, and to prevent the grease from being undesirably transferred to other unintended surfaces during handling or storage.

Further, a hookup chain 108, having been released from the hookup brackets not shown, but which were previously described, are shown being preferably retained by a chain retainer, for example, a typical elastomeric cord 501, for efficient storage. The chain retainer is removably attached to a hook retainer slot 502 provided for in the removable cover of the present invention.

Those skilled in the art will immediately appreciate the previously unavailable benefits provided by a new and novel cover of the present invention, namely hookup chain management, and the protection of the greased portion of the spring bar assembly during removal, handling and storage when not in use for towing.

Figures 6, 7:
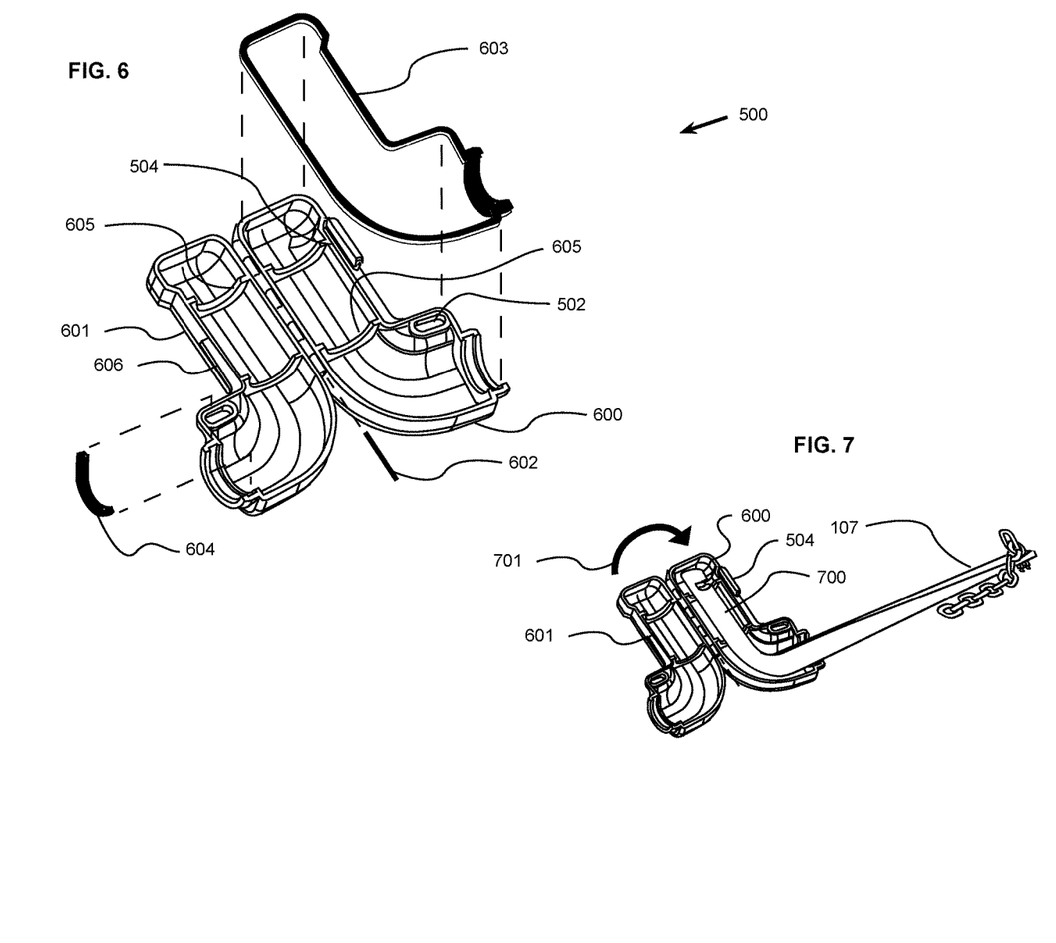
FIG. 6 is an exemplary diagram showing an exploded assembly view of a hinged cover assembly.
FIG. 7 is an exemplary diagram showing the greased area of a round spring bar positioned within a hingedly opened enclosure assembly.

FIG. 6 is an exemplary diagram showing an exploded assembly view of a spring bar cover 500 comprising a first half shell 600 of a spring bar cover, a second half shell of a spring bar cover 601 and a hinge pin 602 hingeably connecting the hinge portions of each half shell.

It should be noted that the word "half" as user herein is not meant to be limiting, as one enclosing portion of the assembly may comprise less than one half of the cross sectional area of the closed assembly, and an opposed portion of the assembly may comprise more than one half of the cross sectional area of the closed assembly. In other words, although the two mating portions of a clamshell type of cover may preferably be mirror images of each other, in the alternate, the two halves may not be mirror images so long as the closed enclosure provides the support and functionality of the present invention as described herein.

Further, those skilled in the art will appreciate that as an alternative to molding two shell parts and hingeably connecting the two parts by means of a hinge pin as just described, various thermoplastics may be used to form a single structure comprising a first half shell, a second half shell, and an integrally molded resilient thin section of thermoplastic between the first half shell and second half shell, the thin section forming what is well known in the industry as a living hinge.

The two halves as just described are shown in the opened position. As one means to prevent dust and dirt from entering into the cover when closed, a ring gasket 603 is positioned between the substantially parallel and opposed mating surfaces of the two enclosure half shells. A second gasket strip 604 is affixed to the concave open shoulder of the cover, the opening through which the ungreased portion of the round spring bar will project.

As a sound means to secure a hookup chain affixed to the distal end of the round spring bar not shown, one or more hook retainer slots 502 through the cover material are therefore provided. A slide latch 504 secures the two half shell components together once closed around the spring bar.

A plurality of internal standoff 605 features are shown on the interior of each half of the enclosure, the standoff features preferably comprising ribs that will contact a minimally small portion of the greased surface area of the spring bar. The advantage of the standoff features, not previously available on traditional spring bar covers, is to minimize the contact area between the greased spring bar and the cover. Those skilled in the art will immediately appreciate that traditional methods of covering the greased area of the spring bar maximize contact between the cover and greased area of the spring bar, a undesirable method that transfers a substantial amount of grease from the spring bar to the interior surface of the cover.

Therefore, the standoff features provide for a majority of the grease that was applied to the spring bar for use to remain on the spring bar throughout handling and storage, ready for future use. The novel standoff features minimize the requirement to replace the grease that is otherwise removed by traditional covers that inadvertent contact larger surfaces of the greased spring bar.

FIG. 7 is an exemplary diagram showing the greased area of a round spring bar 107 positioned within a hingedly opened enclosure assembly. In the drawing, a first half shell of a spring bar cover 600 is hingedly attached to a second half shell of a spring bar cover 601, the two half shells being opened to receive the greased portion of a round spring bar 700. A portion of the substantially longitudinal length of the spring bar is shown projecting beyond the open end of the cover assembly.

Although a substantially rigid "clamshell" type of enclosure is shown in the drawing without a gasket positioned to seal the clamshell halves when in the closed position, in another variation of the present invention, one or more gaskets may installed along surfaces of at least one half shell of the assembly such that upon closing the two halves together 701, the gaskets preferably seal the space between the first and second halves to prevent leakage of lubricant contained inside the enclosure, and further to prevent contamination of the greased portion of the spring bar from contaminants outside of the enclosure.

A slide latch 504 secures the two halves of the enclosure to one another in the closed position when desired. The actual method of latching the halves closed is not meant to be limiting, and may include male and female interconnecting snap features, sliding latches, detents, or buckles installed in secondary manufacturing operations.

Figure 8:
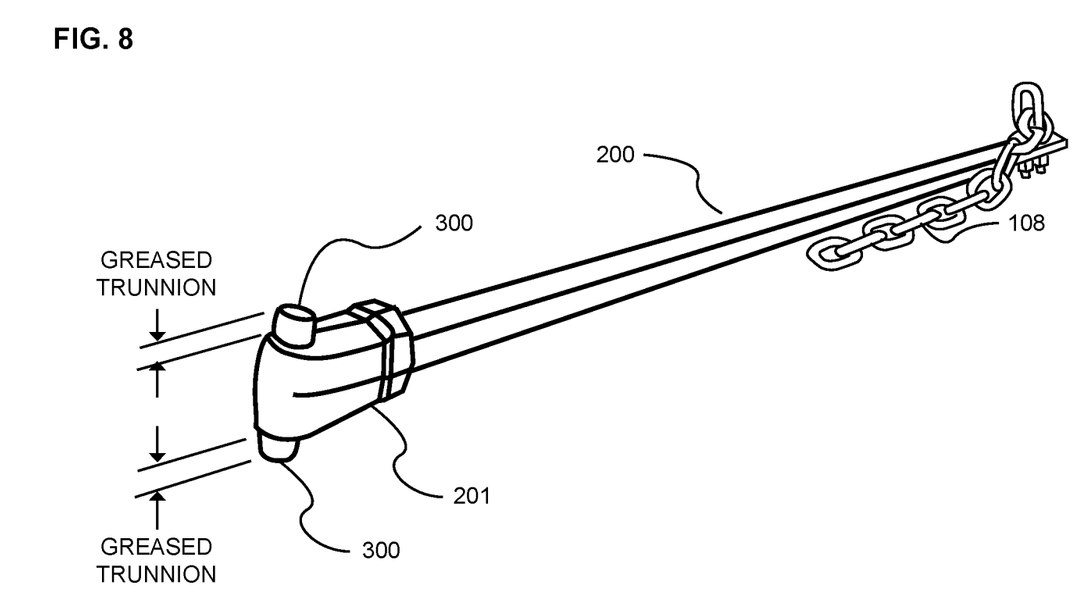
FIG. 8 is an exemplary diagram showing the greased areas of a trunnion spring bar assembly.

FIG. 8 is an exemplary diagram showing the greased areas of a trunnion spring bar assembly. In the drawing, a trunnion spring bar assembly comprising a spring bar 200, trunnion end 201, a plurality of trunnions 300, and a hookup chain 108 is shown without a cover. It is preferred that the greased trunnions be enclosed and protected after removal from the adjustable trunnion head as previously described, thereby preventing unwanted contact with, or contamination to the grease on the trunnions.

Figure 9:
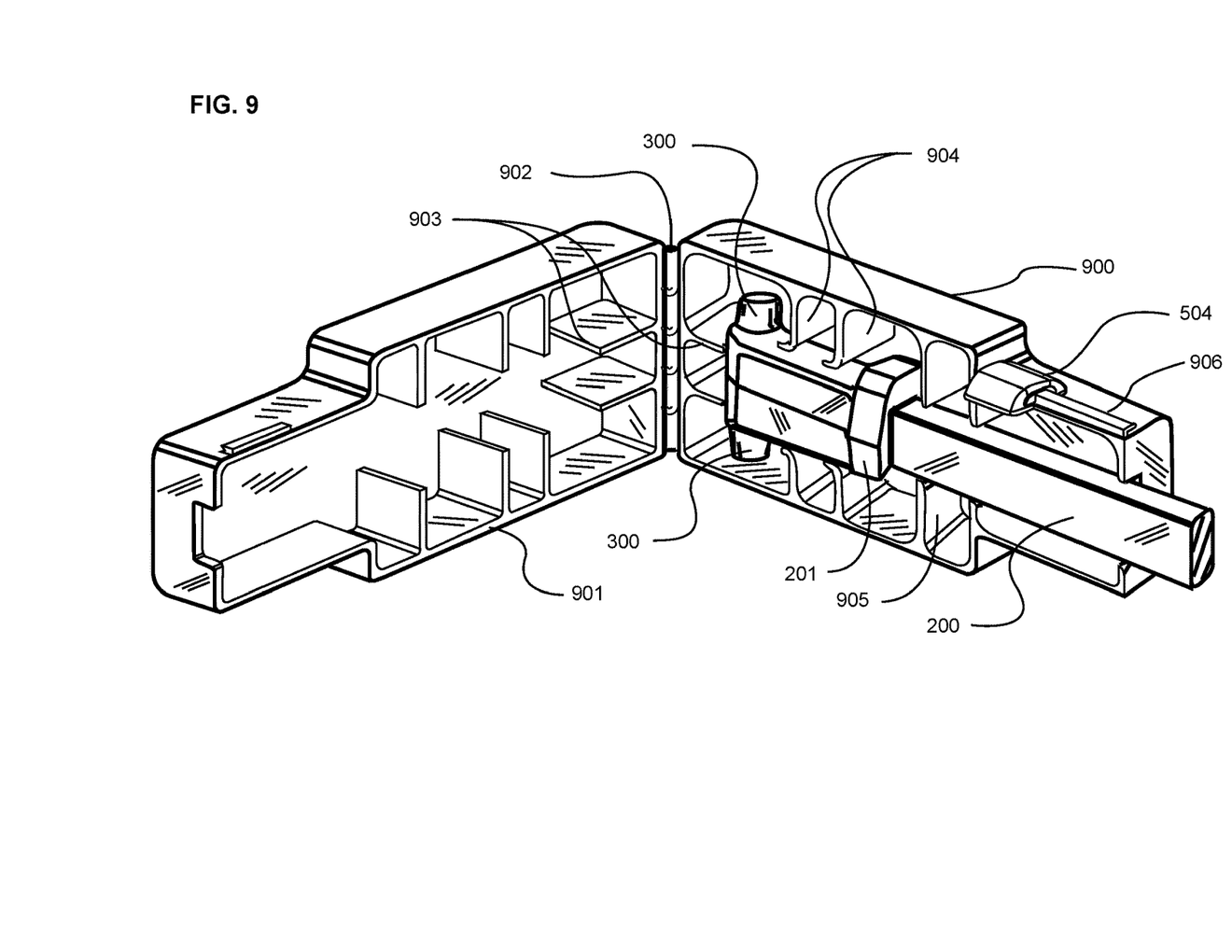
FIG. 9 is an exemplary diagram showing the greased area of a trunnion spring bar positioned within a hingedly opened enclosure assembly in accordance with another one of the various embodiments of the invention.

FIG. 9 is an exemplary diagram showing the greased area of a trunnion spring bar positioned within a hingedly opened enclosure assembly. In the drawing, a first half shell 900 and a portion of the second half shell 901 are shown hingedly connected by means of a hinge pin 902 to form a clamshell type of enclosure. The interiors of the first and second halves of the enclosure are preferably substantially mirror images of the other, but may be of different designs so long as the functionality of the present invention as described herein is achieved.

Further, those skilled in the art will appreciate that as an alternative to molding two shell parts and hingeably connecting the two parts by means of a hinge pin as just described, various thermoplastics may be used to form a single structure comprising a first half shell, a second half shell, and an integrally molded resilient thin section of thermoplastic between the first half shell and second half shell, the thin section forming what is well known in the industry as a living hinge.

A plurality of standoff features positions a trunnion spring bar 200 and trunnion bar end 201 within but not in contact with the interior surface of the exterior half shell covers.

More specifically, it is preferable that the cover of the present invention prevent greased trunnions 300 from contacting any surface that may remove the previously applied grease, or any surface or materials that may contaminate the grease. Therefore, a plurality of substantially rigid longitudinal trunnion head standoffs 903 prevent longitudinal movement of the trunnion bar assembly whereby the greased trunnions could contact the interior surface of the enclosure.

A plurality of substantially rigid trunnion bar standoffs 905 extending laterally inward from the interior surface of the cover shells provide multiple functions, those being to position the trunnion spring bar assembly substantially centered within the interior geometry of the cover, and to substantially limit the longitudinal movement of the trunnion head within the closed enclosure.

Although not required, it is desirable to minimize movement of the trunnion head within a closed enclosure, thereby minimizing the potential for the greased trunnions to contact an interior surface of the enclosure. In the drawing, a plurality of substantially resilient lateral trunnion head standoffs 904 are shown in a flexed orientation, thereby providing substantially the same lateral inward pressure against the trunnion bar end to center the bar end within the interior of the enclosure.

Those skilled in the art will understand that forming substantially resilient standoffs can be achieved a number or ways, including:

a. injection molding the entire enclosure shell of a resilient polymer material which, by design, flows into mold details to form resilient standoffs of the same monolithic material;

b. injection molding the entire enclosure shell of a substantially rigid polymer material, by design, flowing the substantially rigid material into mold details that significantly reduce the cross section of the rigid materials such that is will deform and flex to accommodate a trunnion bar end; or c. forming a substantially rigid exterior shell of thermoformed polymer, and co-injecting or insert molding substantially resilient standoffs of the desired size and position within the interior of the substantially rigid exterior shell.

The methods of producing the dual functions of durable exterior and resilient interior standoffs as just described are not meant to be limiting, and those skilled in the art will understand that other well-known materials and methods of manufacturing may be used to accomplish the same or similar functionality.

A slide latch 504 is moved along the latch rail 906 secure the two halves of the enclosure to one another in the closed position when desired. The actual method of latching the halves closed is not meant to be limiting, and may include male and female interconnecting snap features, sliding latches, detents, or buckles installed in secondary manufacturing operations.

Figure 10:
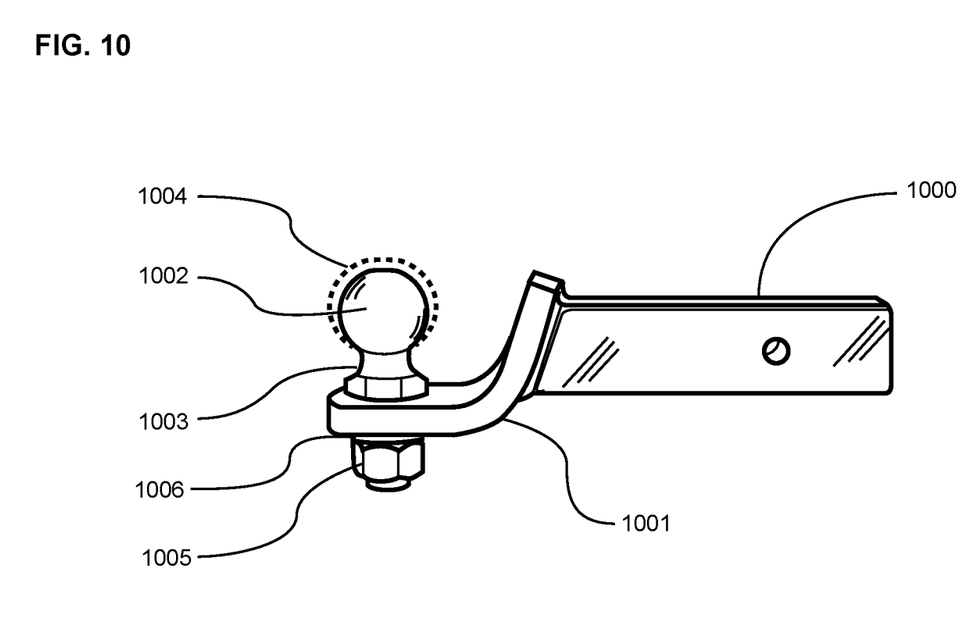
FIG. 10 is an exemplary diagram showing a side view of two diameters of a trailer hitch ball mounted on a receiver hitch assembly.

FIG. 10 is an exemplary diagram showing a side view of two standard diameters of a trailer hitch ball mounted on a receiver hitch assembly. More specifically, a receiver hitch assembly comprises receiver hitch shank 1000 to which a ball mounting plate 1001 is welded. The ball mounting plate, having been provided with a hole through, allows for the threaded shank of a small diameter hitch ball 1002 to pass through and be retained by a lock washer 1006 and tightened nut 1005.

The trailer hitch ball, being substantially spherical, provides for a ball collar 1003 to transition the ball from a sphere to flat plate mounting surface. The undercut formed by the underside arc of the ball sphere and shoulder provide a gripping surface for the coupler latch, the latch thereby preventing the coupler from being uplifted off of the ball during towing.

The top and other spherical surfaces of the hitch ball receive contact of varying forces by the coupler socket both when the tow vehicle and trailer are parked and not moving, as well as when the trailer and the vehicle are moving over smooth roads or rough terrain.

Those skilled in the art will appreciate that hitch balls are available in different diameters, with the diameter being defined by the coupler socket diameter, the intended duty cycle, or a combination of the two. For reference purposes only, the relative outline of a larger diameter hitch ball 1004 is shown on the drawing as a dotted line.

Figure 11A:
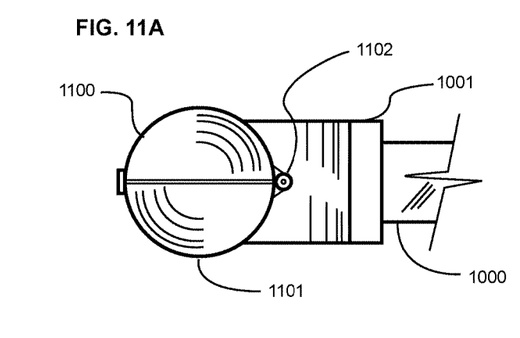
FIG. 11A is an exemplary diagram showing a top view of a cover enclosing a trailer hitch ball.

FIG. 11A is an exemplary diagram showing a top view of a cover enclosing a trailer hitch ball comprising a first half of a hitch ball cover 1100, and a second half of a hitch ball cover 1101 hingedly connected by means of a hinge 1102. In the top view, a ball mounting plate 1001 is permanently affixed to a receiver hitch shank 1000. The greased hitch ball not shown is retained within the closed cover assembly just described.

Figure 11B:
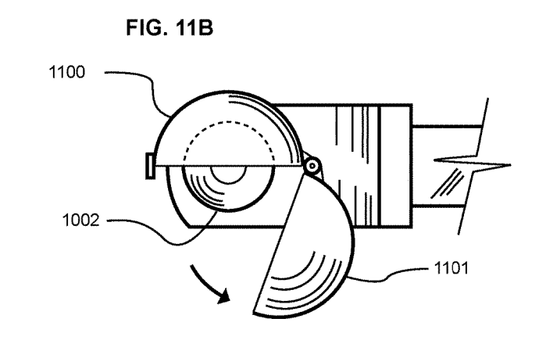
FIG. 11B is an exemplary diagram showing a top view of a cover hingedly opened revealing one half of an enclosed a trailer hitch ball.

FIG. 11B is an exemplary diagram showing a top view of a cover hingedly opened revealing one half of an enclosed a trailer hitch ball. More specifically, to illustrate the relationship between the greased hitch ball 1002 and cover, a first half of a hitch ball cover 1100 is shown installed around a hitch ball 1002, and a second half of the hitch ball cover 1101 is shown in the hingedly open position to reveal the hitch ball. When closed and latched, the substantially spherical hitch ball cover is retained about the substantially spherical hitch ball.

Figure 11C:
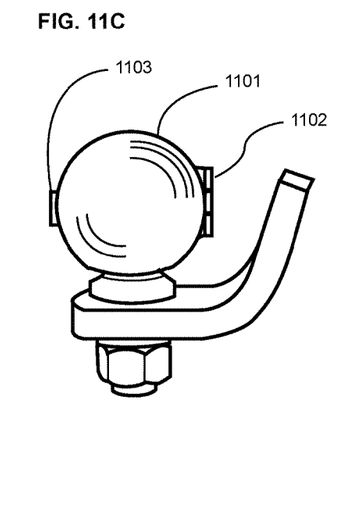
FIG. 11C is an exemplary diagram showing a side view of a cover enclosing a trailer hitch ball.

FIG. 11C is an exemplary diagram showing a side view of a cover enclosing a trailer hitch ball. As can be readily seen, the near second half of the hitch ball cover 1101 is substantially spherical, with a sphere center approximating the spherical center of the hitch ball which the cover encloses. The two opposed halves of the cover are hingedly attached by means of a hinge 1102, and are secured closed by means of a latch 1103, the latch being one of a large number of well known designs, for example, molded in details providing for mating male and female features, undercuts and interference fit details, or latch components installed upon the halves of the cover. The specific methods of latching and hinging as shown are not meant to be limiting.

Figure 11D:
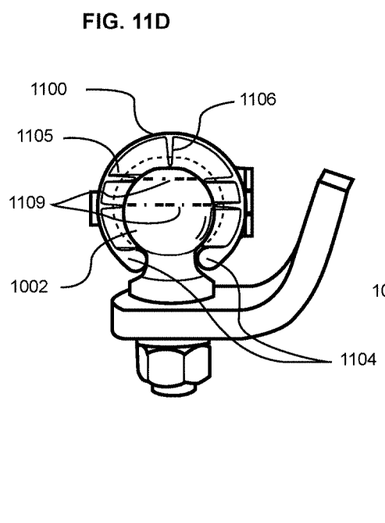
FIG. 11D is an exemplary diagram showing a side view of the interior of a cover enclosing a small diameter trailer hitch ball.

FIG. 11D is an exemplary diagram showing a side view of the interior of a cover enclosing a small diameter trailer hitch ball. More specifically, the second half of the hinged cover has been removed from the cover assembly to provide an un-obscured view of the interior detail of the first half of the cover 1100 when positioned over a trailer hitch ball 1002.

As previously described, the preferred function of the present invention is to maximize the protection of greased towing components from being contaminated, or from contaminating surfaces into which they come in contact, and further minimize the potential for unintended removal of lubricant from the component by installation or removal of the cover.

It is well known that a sphere is naturally inclined to rotate within a sphere. One feature of the present invention is a ball shank collar rib 1104 positioned at the bottom opening of the substantially spherical cover. The collar is intended to fit snugly about the collar of the hitch ball shank so as to limit the possible range of rotation of the cover 1100 to the longitudinal axis of a small diameter hitch ball 1002 and threaded hitch ball shank.

A plurality of standoff features extend inwardly from the interior surface of the first and second halves of the cover. More specifically, a vertical standoff 1106 is aligned substantially with the vertical, longitudinal axis of the threaded hitch ball shank, thereby providing a predictable distance between the creased hitch ball and the interior surface of the top of the cover.

A plurality of ball cover standoffs 1105 project inwardly from the interior surface of the hitch ball cover, said standoffs being aligned substantially at right angles to the longitudinal axis of the threaded hitch ball shank. The surface area of contact between the greased hitch ball and standoffs is preferably minimal, yet the standoffs position the exterior of the cover substantially equidistant from the greased surface of the hitch ball.

It is important to note that the purpose of the right angle orientation of said standoffs is to limit the rotation of the ball cover about the longitudinal axis of the hitch ball shank, and correspondingly minimize the potential transfer of grease from the hitch ball to the proximal ends of the standoffs. In other words, rotating the ball cover about the one permittable axis of rotation about the hitch ball will merely leave a small horizontal grove as indicated by the groove dashed line 1109 in the grease that was applied to the hitch ball, leaving all other areas of the greased hitch ball untouched by the cover or any unintended contact surfaces thereof.

Figure 11E:
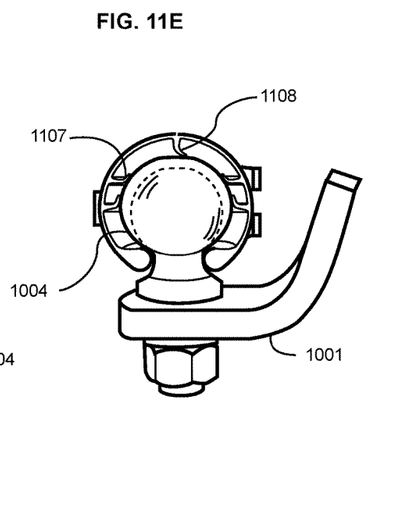
FIG. 11E is an exemplary diagram showing a side view of the interior of a cover enclosing a large diameter trailer hitch ball.

FIG. 11E is an exemplary diagram showing a side view of the interior of a cover enclosing a large diameter trailer hitch ball. It is commercially advantageous to produce and sell one size of hitch ball cover that will fit a plurality of standard hitch ball diameters. One means to accomplish this objective is to allow the internal standoff features to flex, and therefore close securely on large diameter hitch balls and smaller diameter hitch balls alike.

In the drawing, the larger diameter hitch ball 1004 is secured to the ball mounting plate 1001, the dotted line sphere indicating the relative size of a smaller diameter hitch ball. A deformed vertical standoff 1108 (shown non-deformed in 1106, FIG. 11D) is shown slightly flexed to accommodate the larger diameter ball. Similarly, the deformed substantially horizontal standoffs 1007 (shown non-deformed in 1105, FIG. 11D), are shown in a flexed position to allow the opposed halves of the hinged spherical cover to close over a larger diameter hitch ball.

All other functional elements of the cover remaining unchanged regardless of which standard diameter hitch ball the cover may be mounted to, the actual surface area contact between the flexed or un-flexed standoffs and the greased hitch ball remain minimal, thereby minimizing removal of grease from the hitch ball while maximizing the preferred protection function provided by the cover of the present invention.

The various embodiments of the present invention as just described therefore provide for a new and novel method of handling and storing greased towing components such that the greased areas of the towing components are protected from contamination by dirt or other materials the components may come in contact with during storage, protect the towing components from contaminating or soiling materials or surfaces the greased portions of the components may come in contact with during handling or storage, and further minimize or prevent the transfer of grease from the greased component to the inside of the protective cover of the present invention.

Unless otherwise defined, all technical and scientific terms used herein have the same meaning as commonly understood by one of ordinary skill in the art to which this invention belongs. Although methods and materials similar to or equivalent to those described herein can be used in the practice or testing of the trailer hitch spring bar cover system, suitable methods and materials are described above. All publications, patent applications, patents, and other references mentioned herein are incorporated by reference in their entirety to the extent allowed by applicable law and regulations. The trailer hitch spring bar cover system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A cover for a trailer weight distribution spring bar, comprising:
   a first body having a first end, a second end, a perimeter edge a cavity between the first end and the second end of the first body, and a cutout near the second end of the first body;
   a second body having a first end, a second end, a perimeter edge, a cavity between the first end and the second end of the second body, and a cutout near the second end;
   wherein the second body is movably connected to the first body;
   wherein the cover has an opened state wherein the perimeter edges of the first body and the second body are separated sufficiently to partially insert a greased portion of a spring bar into one of the cavities of the first body or the second body;
      wherein the cover has a closed state wherein the perimeter edges of the first body and the second body are adjacent one another to form a substantially enclosed receiving cavity comprised of the cavities of the first body and the second body, wherein the receiving cavity is adapted to receive the greased portion of the spring bar when the cover is in the closed state so the cover protects the greased portion of the spring bar, and wherein the cutouts of the first body and the second body form an opening when the cover is in the closed state to allow a portion of the spring bar to extend through the opening outwardly from the cover, and wherein the first ends of the first body and the second body form a closed end when the cover is in the closed state;
      wherein the first body and the second body each include a rib extending inwardly, and wherein a channel that holds a portion of the spring bar is formed between the rib of the first body and the rib of the second body when the cover is in the closed state;
      and wherein the rib of the first body and the second body are substantially rigid.
2. The cover of claim 1, wherein the second body is pivotally connected to the first body by a hinge.
3. The cover of claim 2, wherein the hinge is connected to the respective first ends of the first body and the second body.
4. The cover of claim 2, wherein the hinge is connected to a side portion of the first body and the second body.
5. The cover of claim 1, wherein the first body and the second body mirror one another.
6. The cover of claim 1, wherein the first body and the second body each form half-shells.
7. The cover of claim 1, wherein the cover is substantially L-shaped.
8. The cover of claim 1, wherein the cover is substantially longated.
9. The cover of claim 1, including a seal positioned between the perimeters of the first body and the second body.
10. The cover of claim 1, including a first seal portion attached to the first cutout of the first body and a second seal portion attached to the second cutout of the second body.
11. The cover of claim 10, wherein the first seal portion and the second seal portion each have a C-shaped structure adapted to form a seal about a perimeter of the spring bar when the cover is in the closed state.
12. The cover of claim 1, wherein the first body includes an eyelet.
13. The cover of claim 12, wherein the second body includes an eyelet, wherein the eyelet of the first body is substantially aligned with the eyelet of the second body to form an opening when the cover is in the closed state.
14. The cover of claim 1, wherein the rib of the first body and the rib of the second body form a ring shaped structure when the cover is in the closed state.
15. The cover of claim 14, wherein the rib of the first body and the second body are substantially transverse with respect to a longitudinal axis of the cover.
16. The cover of claim 1, including a locking member, wherein the locking member is adapted to secure the first body to the second body when in the closed state.
17. The cover of claim 16, wherein the locking member is comprised of a slide latch.
18. A method of using the cover of claim 1, comprising:
   positioning the cover into the open state;
   positioning the first body or the second body about the greased portion of the spring bar;
   positioning the cover into the closed state so that the first body and the second body substantially enclose the greased portion of the spring bar.
19. The cover of claim 1, wherein the first body and the second body each include at least two ribs extending inwardly, and wherein a channel that contacts and holds a portion of the spring bar is formed between the ribs of the first body and the ribs of the second body when the cover is in the closed state.
20. A cover for a trailer weight distribution spring bar, comprising:
   a first body having a first end, a second end, a perimeter edge a cavity between the first end and the second end of the first body, and a cutout near the second end of the first body;
   a second body having a first end, a second end, a perimeter edge, a cavity between the first end and the second end of the second body, and a cutout near the second end;
   wherein the second body is movably connected to the first body;
   wherein the cover has an opened state wherein the perimeter edges of the first body and the second body are separated sufficiently to partially insert a greased portion of a spring bar into one of the cavities of the first body or the second body;

wherein the cover has a closed state wherein the perimeter edges of the first body and the second body are adjacent one another to form a substantially enclosed receiving cavity comprised of the cavities of the first body and the second body, wherein the receiving cavity is adapted to receive the greased portion of the spring bar when the cover is in the closed state so the cover protects the greased portion of the spring bar, and wherein the cutouts of the first body and the second body form an opening when the cover is in the closed state to allow a portion of the spring bar to extend through the opening outwardly from the cover, wherein the first ends of the first body and the second body form a closed end when the cover is in the closed state; and wherein the first body and the second body each include a rib extending inwardly, and wherein a channel that holds a portion of the spring bar is formed between the rib of the first body and the rib of the second body when the cover is in the closed state; and wherein the rib of the first body and the rib of the second body form a ring shaped structure when the cover is in the closed state.

21. The cover of claim 20, wherein the rib of the first body and the second body are substantially transverse with respect to a longitudinal axis of the cover.

\* \* \* \* \*